June 2, 1936.   C. E. PLOEGER   2,043,059
MAGNETIC UNLOADER
Filed Aug. 8, 1933

INVENTOR.
C. E. Ploeger
BY
ATTORNEY.

Patented June 2, 1936

2,043,059

UNITED STATES PATENT OFFICE 2,043,059

MAGNETIC UNLOADER

Clyde E. Ploeger, Evansville, Ind., assignor to Servel, Inc., New York, N. Y., a corporation of Delaware Application August 8, 1933, Serial No. 684,147

11 Claims. (Cl. 62—4)

This invention relates to unloaders for electric motors, especially motors for operating refrigeration systems of the compression type, and generally of the type disclosed in my copending application Serial No. 483,148 of which the present application is a continuation in part.

In my said earlier application there is disclosed an unloader for an electric motor having an actuating member of magnetic material which is adapted to be so positioned with respect to the motor that it is attracted by the strong leakage field during the starting period of the motor and is retracted by suitable means such as a spring or gravity when the leakage field decreases upon attainment of normal speed. There is illustrated in my said application a vertical compressor-unit of an hermetically sealed refrigeration system, the compressor being provided with an unloading valve actuated by a magnetic ring located above the upper end of the motor where it is attracted upon increase of leakage flux and retracted by a spring upon decrease in the leakage flux. As set forth in my said earlier application, the magnetic actuating member may be retracted by gravity means instead of a spring.

In accordance with the present invention I provide a gravity biased unloader for the motor-compressor unit of a refrigeration apparatus which is compact in construction and efficient in operation.

Figure 1:
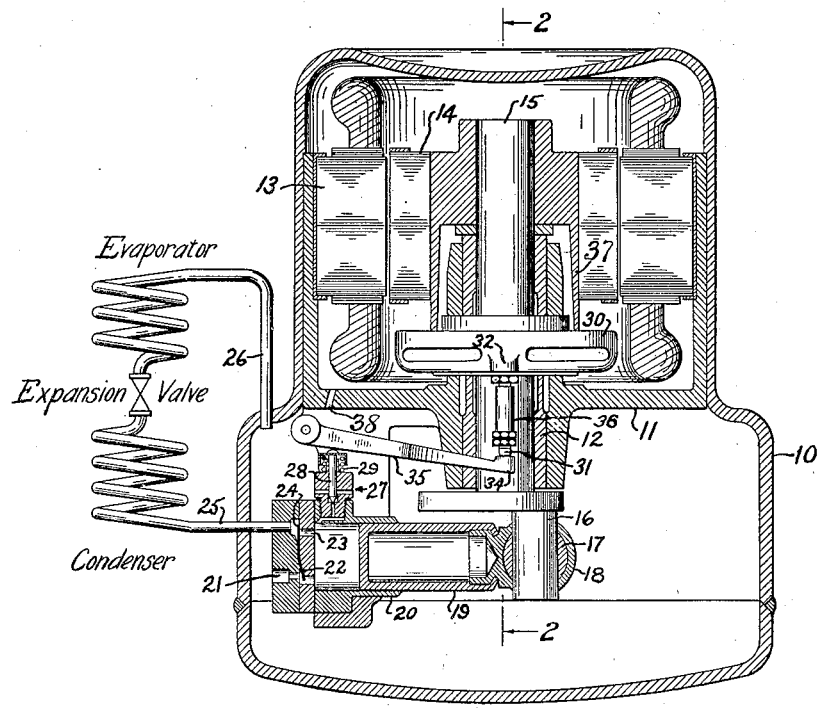
Figure 2:
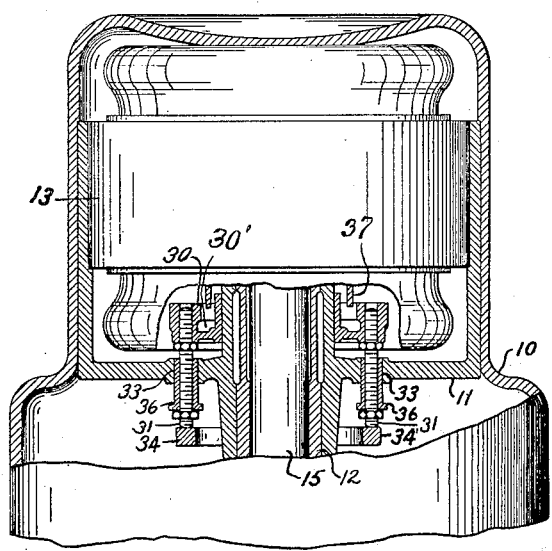

Other objects and advantages will be apparent from the following description taken in connection with the accompanying drawing, in which, Fig. 1 shows diagrammatically a refrigeration system including a motor-compressor unit in vertical section illustrating one application of the invention;

Fig. 2 is a fragmentary section of the unit taken on line 2—2 in Fig. 1; and

Figure 3:
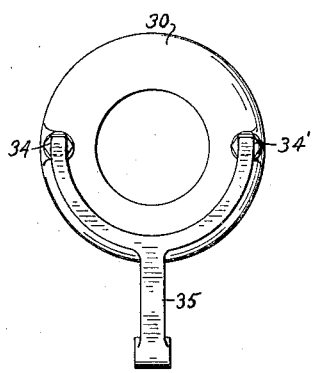

Fig. 3, a bottom plan view of only the unloader linkage shown in Figs. 1 and 2.

Referring to the drawing, an hermetically sealed casing 10 encloses the motor-compressor unit of a refrigeration system. Within the casing 10 is secured a frame 11 provided with a vertical thrust bearing 12. As shown, the frame 11 may be secured by a shrink-fit within the upper reduced portion of the casing 10. Within the upper part of the casing there is an electric induction motor comprising a stator 13 and a rotor 14. The stator is mounted on the frame 11 within the reduced portion of the casing 10, as shown, for good heat dissipation. To increase heat radiation from the unit, the upper reduced portion of the casing 10 may be provided with radiation fins, not shown. The rotor 14 is mounted on the upper end of a vertical shaft 15 which is journaled in the bearing 12.

The lower end of the shaft 15 is provided with a crank 16 journaled in a cylindrical crosshead 17. The latter is reciprocable in a tubular yoke 18 to which is secured the compressor piston 19. The latter is reciprocable in a cylinder 20 mounted on the underside of the frame 11. The compressor cylinder 20 is provided with an intake port 21 controlled by a flexible flap valve 22 and a discharge port 23 controlled by a valve 24.

The discharge side of the compressor is connected through a conduit 25 to the condenser and the latter is connected through an expansion valve to the evaporator. From the latter a suction line 26 is connected to the motor-compressor unit casing 10. In operation, a suitable refrigerant gas, for instance methyl chloride, is discharged under pressure from the compressor to the condenser where the refrigerant is condensed to liquid. The liquid is admitted to the evaporator from the condenser through the expansion valve which maintains a pressure difference between these two elements. In the evaporator the liquid vaporizes to produce a refrigerating effect, as well known in the art, and the refrigerant vapor returns through conduit 26, the chamber enclosed by the casing 10, and intake port 21 to the compressor, thus completing the refrigerant cycle.

The compressor cylinder 20 is provided with a pressure relief or unloading valve indicated generally by the reference numeral 27. The valve member, comprising a needle 28, is urged by a small spring 29 to the open position in which pressure within the compressor cylinder 20 is relieved into the chamber enclosed by the unit casing 10, thus controlling a connection from the high pressure to the low pressure side of the compressor.

Below the electric driving motor an annular member 30 of magnetic material is positioned in such a manner as to be linked by the magnetic leakage flux of the motor. As shown, the magnetic member 30 may be guided for vertical reciprocation by that portion of the frame 11 in which is mounted the bearing 12. Depending from the magnetic ring 30 are diagonally opposite studs 31 which are preferably made adjustable by threading into corresponding tapped bosses 32 on the magnetic member 30. These studs 31 extend through guide openings 33 in the frame 11 and rest in operative engagement upon the ends 34 of a bifurcated lever 35. The other end of the lever 35 is suitably pivoted on the underside of the frame 11 so that the lever rests in operative engagement upon the unloading valve 27.

The weight of the member 30 resting on the ends 34 of the lever 35 is sufficient to normally force the unloading valve needle 28 downwardly to its closed position, thus cutting off communication between the high and low pressure sides of the compressor. However, when the circuit of the motor is closed while the rotor is at a standstill, excessive currents flow in both field and armature windings causing a distortion of the magnetic flux which extends beyond the normal magnetic path and creates a strong magnetic leakage field. The magnetic annulus 30, being positioned within said leakage field, is attracted upwardly, thus removing its weight from the ends of the lever 35, whereupon the unloading valve 27 is opened by the spring 29 to equalize the pressures on the high and low sides of the compressor. Upward movement of the magnetic member 30 is limited to prevent contact with the motor by flanged sleeves 36 threaded on the studs 31. The sleeves 36 may be adjusted to vary the distance through which member 30 moves. As the rotor comes up to speed, the current in the windings decreases and the strength of the leakage field diminishes, whereupon the magnetic member 30 drops back under the force of gravity to reclose the unloading valve 27. It will be understood that the magnetic member 30 is heavy enough to prevent movement due to the magnetic field of the motor during normal operation and also to close the valve 27 against the action of the spring 29. It is clear that the lever 35 may be directly connected to operate the valve 27 and the magnetic member 30 directly connected to the lever 35 thereby carrying out the above operation of the valve 27 without the provision of the spring 29.

Lubricating oil is supplied from the sump formed by the bottom of the casing 10 to the bearing 12 by suitable means such as a pump, not shown. Such lubrication means forms no part of this invention but is preferably of the type disclosed in Patent No. 1,910,498 to Ploeger et al. of May 23, 1933, in which oil is pumped through the hollow motor shaft to the bearing. Some of the lubricating oil, which is fed to the bearing 12 under pressure, escapes from the upper end of the bearing and flows downwardly within the flange 37 of the rotor 14 into the trough 30' of the tray-like operating member 30 into which the flange 37 extends. The oil drains from the trough 30' and through the frame 11 back to the lower part of casing 10 by way of one or more drain holes 38. The latter may be arranged for distribution of oil over parts therebelow in the lower part of the casing.

It will be obvious to those skilled in the art that various other changes may be made in the construction and arrangement without departing from the spirit of the invention and therefore the invention is not limited to what is shown in the drawing and described in the specification but only as indicated in the following claims.

I claim:

1. In combination with a compressor driven by an electric motor, an unloading valve for said compressor, and means for actuating said valve including an annular member of magnetic material vertically reciprocable below said motor so as to be raised against the force of gravity upon increase in strength of the magnetic leakage field of said motor.

2. In combination, a compressor, a vertical electric motor above said compressor, a driving connection between said motor and compressor, an unloading valve for said compressor, and actuating means for said valve including an annular member of magnetic material encircling said driving connection and vertically reciprocable adjacent said motor so as to be raised against the force of gravity upon increase in strength of the magnetic leakage field of said motor, and a lever operatively connecting said valve and said annular member.

3. In a refrigeration system of the compression type, a motor-compressor unit comprising a vertical electric motor having a shaft operatively connected at its lower end to a compressor, an unloading valve for said compressor, and actuating means for said valve comprising an annular member of magnetic material encircling said shaft below the motor and guided for vertical reciprocation within the magnetic leakage field of the motor and a lever operatively engaging said valve and having a bifurcated end straddling said motor shaft in operative engagement with said annulus at diagonally opposite points thereof.

4. In a refrigerating system, a motor compressor unit, a reciprocable member located below said motor, an unloading valve for the compressor, an element associated with said valve and disposed in the path of movement of said reciprocable member, the construction being such that movement of the reciprocable member in one direction will permit the valve to open and movement in the opposite direction will cause the valve to close.

5. An electric motor, a reciprocable member of magnetic material mounted axially of said motor and attractable upon increase in strength of the magnetic leakage field of the motor at the time of starting and being constructed to return to its original position after the motor has attained speed, means connected to be driven by said motor whereby a load is imposed on said motor, means for relieving the motor of its load, and means associated with said last mentioned means and disposed in the path of movement of said reciprocable member in a manner to be operated thereby.

6. An electric motor, a reciprocable member of magnetic material mounted axially of said motor and attractable upon increase in strength of the magnetic leakage field of the motor at the time of starting and being constructed to return to its original position after the motor has attained speed, means connected to be driven by said motor whereby a load is imposed on said motor, means for relieving the motor of its load, means associated with said last mentioned means and disposed in the path of movement of said reciprocable member in a manner to be operated thereby, and adjustable means between said reciprocable member and member extending in its path for varying the amount of movement of said load relieving member.

7. A motor compressor unit for a refrigerating system comprising a casing, a partition member in said casing dividing said casing into upper and lower chambers, said partition being provided with a drain orifice, whereby liquid can pass by gravity from the upper chamber to the lower, a bearing mounted centrally of said partition, a shaft journalled in said bearing and having a crank on its lower end, a motor mounted in the upper chamber and having its rotor fixed on said shaft to drive the same upon energization of the motor, a compressor in said lower chamber arranged to be driven by said crank, a magnetic member attractable responsive to increase in strength of the magnetic leakage field of the motor when starting, an unloader valve associated with the compressor, and a connection between said reciprocable member and said valve whereby said valve will be operated by said magnetic member.

8. A motor compressor unit for a refrigerating system comprising a casing, a partition member in said casing dividing said casing into upper and lower chambers, said partition being provided with a drain orifice, whereby liquid can pass by gravity from the upper chamber to the lower, a bearing mounted centrally of said partition, a shaft journalled in said bearing and having a crank on its lower end, a motor mounted in the upper chamber and having its rotor fixed on said shaft to drive the same upon energization of the motor, a compressor in said lower chamber arranged to be driven by said crank, a magnetic member attractable responsive to increase in strength of the magnetic leakage field of the motor when starting, an unloader valve associated with the compressor, a connection between said reciprocable member and said valve whereby said valve will be operated by said magnetic member, said connection comprising an element disposed in the path of movement of said reciprocable member, and adjustable means for varying the relation between said valve and magnetic member for varying the operation of said valve.

9. For use with a refrigerating circuit including a compressor, means to unload said compressor, and a vertically mounted electric motor for driving said compressor, an actuating member comprising a part of magnetic material vertically reciprocable with respect to said motor so as to be raised in opposition to the force of gravity upon increase in strength of the magnetic leakage field of said motor, and means whereby said actuating means controls said unloading means.

10. For use with a refrigerating circuit including a compressor, means to unload said compressor, and a vertically mounted electric motor for driving said compressor, an annular member of magnetic material vertically reciprocable below said motor so as to be raised in opposition to the force of gravity upon increase in strength of the magnetic leakage field of said motor, and means whereby said annular member controls said unloading means.

11. For use with a vertically mounted electric motor, a member driven thereby and means to unload the same, an actuating member comprising a part of magnetic material vertically reciprocable with respect to said motor so as to be raised in opposition to the force of gravity upon increase in strength of the magnetic leakage field of said motor, and means whereby said actuating means controls said unloading means.

CLYDE E. PLOEGER.